March 3, 1936. C. R. ANDERSON 2,033,060

GRILL

Filed April 25, 1932

INVENTOR.
Carl R. Anderson
ATTORNEYS.

Patented Mar. 3, 1936

2,033,060

UNITED STATES PATENT OFFICE 2,033,060

GRILL

Carl R. Anderson, Erie, Pa., assignor to The Griswold Manufacturing Company, Erie, Pa., a corporation of Pennsylvania Application April 25, 1932, Serial No. 607,251

4 Claims. (Cl. 53—5)

The present invention relates to that type of grill in which cooking plates, usually electrically heated, are used for preparing various articles, such as toast and meats where two opposed heating surfaces may be brought into contact with the food being cooked. In carrying out my invention the upper cooking plate is pivotally mounted with relation to the bottom plate and means are provided whereby the closing pressure of the upper plate may be conveniently and efficiently controlled. Features and details of the invention will appear from the specification and claims.

A preferred embodiment of the invention is illustrated in the accompanying drawing as follows:—

Figure 1:
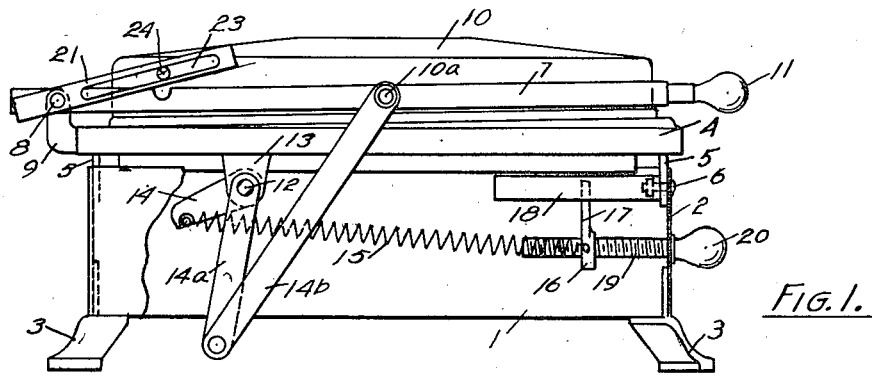

Fig. 1 shows a side elevation of the grill, a part being cut away to better show construction.

Figure 2:
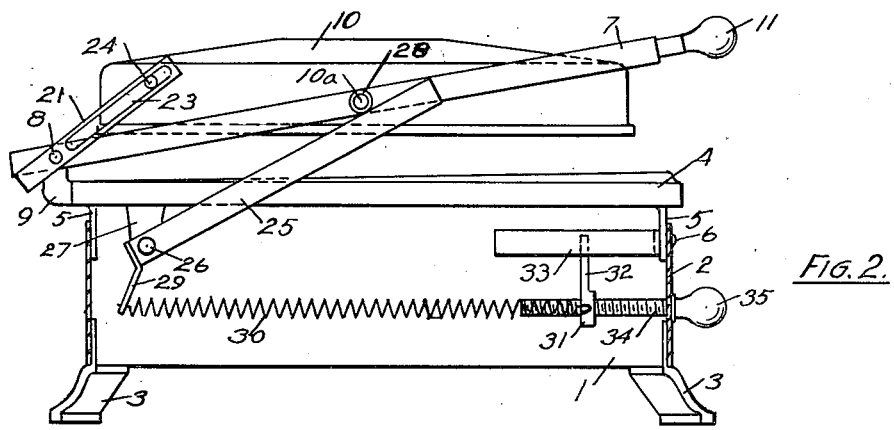

Fig. 2 a similar view of a modified form with one of the side walls of the frame removed to better show construction.

Figure 3:
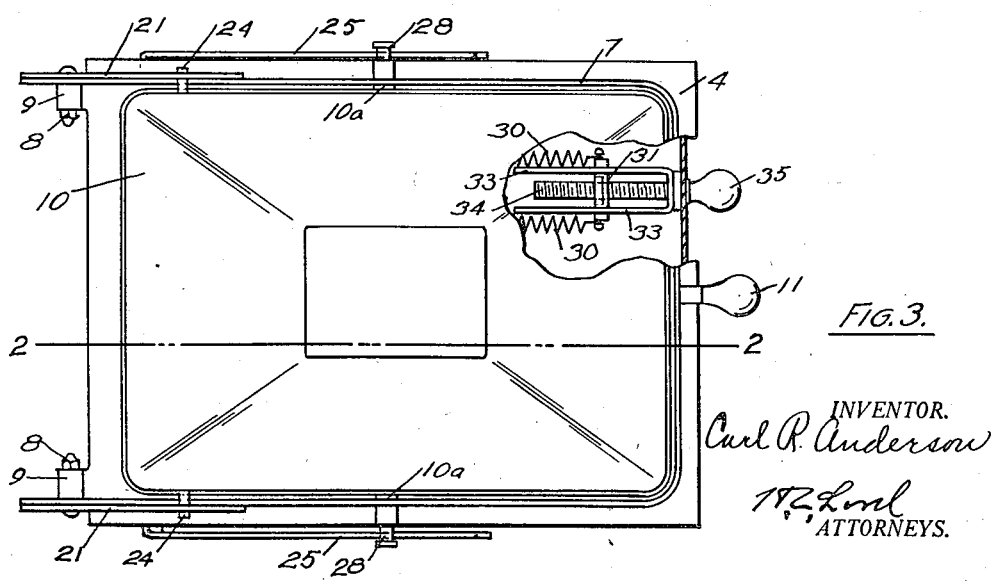

Fig. 3 a plan view of the structure shown in Fig. 2.

1 marks the frame of the grill. This is formed by a surrounding wall 2 with supporting feet 3. A lower cooking plate 4 has downwardly extending flanges 5 which are secured in the walls 2 by screws 6.

A bail 7 is pivoted by means of a pin 8 on an arm 9 extending from the frame of the cooking plate 4. This bail is pivotally connected with the upper cooking plate 10 by means of pins 10a. The bail is provided with a handle 11 at the front of the grill by means of which the upper plate may be lifted for the insertion and removal of the material being cooked, or treated. A cross shaft 12 is journaled in lugs 13 extending downwardly from the base of the cooking plate. It is provided with a rock arm 14. Springs 15 are connected with the rock arm and connected with a nut 16. The nut has an extension 17 which slidingly engages a guide 18 extending from the frame. A screw 19 operates in the nut and this is provided with a handle 20 by means of which the nut may be adjusted and consequently the strength of the spring may be adjusted. Lever arms 14a are secured to the ends of the rock shaft 12 and are connected by links 14b with the pivot pins 10a. The shaft 12 and the arms 14 and 14a form a lever fulcrumed at 12.

It will be seen that the action of the spring on the rock arm 14 and this communicated through the lever 14a and the link 14b to the bail partially supports the upper plate so that the pressure upon the food being prepared, or treated, is reduced. The total closing pressure may be, therefore, equal to the complete gravity thrust of the plate, or through the action of the spring reduced to very much less than this. In fact, the upper plate may be balanced.

In order to control the open position of the upper plate so that the drip from the plate will be carried on to the lower plate from which it may be collected, I provide a link 21 which is pivoted by pin on the arm 9. The link is provided with a slot 23 through which a pin 24 on the rear end of the upper plate extends. As the bail is swung up and the link 21 is carried up with it, the lower end of the link engages the rear end of the base and definitely positions the bottom of the top plate in its open position over the rear of the bottom plate so that the drip is caught by the lower plate.

In the construction shown in Fig. 2, the parts are similar. The frame, lower plate, upper plate and bail, together with the slotted link 21 are the same as in Fig. 1 and operate in the same manner. Levers 25 are formed on the end of a cross bar. The cross bar with the levers form a U-shaped structure. The levers thus connected are pivoted by pins 26 on arms 27 extending from the base of the plate 4. The levers 25 engage a roller 28 mounted on the pivot pin 10a. An arm 29 extends downwardly from the cross member between the levers 25 and springs 30 extend from the lever 29 to a nut 31. The nut has an extension 32 which is slidingly engaged by a guide 33 extending from the frame. The nut is mounted on a screw 34 and is adjusted by a handle 35. Thus the springs may be tensioned and the levers 25 carry more or less of the weight of the upper plate as may be desired.

It will be noted that the upper plate as it is moved involves a relative movement endwise of the levers, so that there is a variation in the effective lever arm due to the relative positioning of the pivot of the lever and the plate. This arrangement is such that the greatest leverage is available when the plate is in its horizontal position and decreases as the plate is lifted to an upright position. The plate in its horizontal position imposes nearly its entire gravity thrust on the levers in their initial movement. But as the plate is lifted, this pressure is less and less until the plate is in the vertical position when the lifting thrust on the levers is zero. Thus the operation of the grill may be more easily accomplished. It also compensates to some extent for the reduction in the force of the spring as the spring contracts. The cross shaft not only makes a simple connection between the lever arms but also makes it possible to arrange the spring in the base and out of sight.

What I claim as new is:—

1. In a grill, the combination of a bottom plate; an upper plate; a swinging connection between the upper plate and the bottom plate; a lever at the side of the plates and pivotally supported relatively to and fulcrumed on the bottom plate at the side of said plate; means communicating the movement of the lever to the top plate comprising devices having sliding engagement with the lever communicating the movement of the lever to the plate; and a spring acting on the lever at a point away from the point of application of its force to the means, the strength of the spring being insufficient to lift the plate from closed position.

2. In a grill, the combination of a bottom plate; an upper plate; a swinging connection between the upper plate and the bottom plate; a lever at the side of the plates and pivotally supported relatively to and fulcrumed on the bottom plate at the side of said plate; means communicating the movement of the lever to the top plate and permitting a movement of the top plate relatively to the lever varying the effective lever arm as the top is moved increasing the leverage as the top plate is lowered; and a spring acting on the lever at a point away from the point of application of its force to the means, the strength of the spring being insufficient to lift the plate from closed position.

3. In a grill, the combination of a bottom plate; an upper plate; a bail pivotally mounted on the bottom plate extending forwardly along the sides of the upper plate and across the front of the upper plate; a pivotal connection between the sides of the upper plate and the bail; a lever at the side of the plates and pivotally supported relatively to and fulcrumed on the bottom plate at the side of said plate; means communicating the movement of the lever to the top plate at the pivot and permitting a movement of the top plate relatively to the lever endwise of the lever increasing the leverage as the top plate is lowered; and a spring acting on the lever at a point away from the point of application of its force to the means, the strength of the spring being insufficient to lift the plate from closed position.

4. In a grill the combination of a bottom plate; an upper plate; a swinging connection between the upper plate and bottom plate; a lever at the side of the plates and pivotally supported relatively to and fulcrumed on the bottom plate at the side of said plate; a link connecting the lever with the upper plate and permitting a movement of the top plate relatively to the lever varying the effective lever arm as the top plate is moved, increasing the leverage as the top is lowered; and a spring acting on the lever at a point away from the point of application of its force to the means, the strength of the spring being insufficient to lift the plate from closed position.

CARL R. ANDERSON.